United States Patent
Constance et al.

(10) Patent No.: US 11,967,064 B2
(45) Date of Patent: Apr. 23, 2024

(54) RAPID SENSING OF BIOLOGICAL AND ENVIRONMENTAL ANALYTES

(71) Applicant: Morgan State University, Baltimore, MD (US)

(72) Inventors: Edward Constance, Washington, DC (US); Kadir Aslan, Towson, MD (US); Enock Bonyi, Rosedale, MD (US)

(73) Assignee: Morgan State University, Baltimore, MD (US)

( * ) Notice: Subject to any disclaimer, the term of this patent is extended or adjusted under 35 U.S.C. 154(b) by 372 days.

(21) Appl. No.: 17/204,194

(22) Filed: Mar. 17, 2021

(65) Prior Publication Data
US 2021/0295505 A1  Sep. 23, 2021

Related U.S. Application Data

(60) Provisional application No. 62/990,489, filed on Mar. 17, 2020.

(51) Int. Cl.
*G06K 9/00* (2022.01)
*A61K 35/12* (2015.01)
(Continued)

(52) U.S. Cl.
CPC ........... *G06T 7/0012* (2013.01); *G01N 21/31* (2013.01); *G06T 7/90* (2017.01); *G06T 2207/10024* (2013.01); *G06T 2207/30072* (2013.01)

(58) Field of Classification Search
CPC ........ G06K 9/00; G01N 21/253; A61K 35/12; G06T 7/00
(Continued)

(56) References Cited

U.S. PATENT DOCUMENTS

| 8,008,067 B2 | 8/2011 | Geddes et al. |
| 9,075,018 B2 | 7/2015 | Geddes et al. |

(Continued)

OTHER PUBLICATIONS

Hong, Jong Il and Chang, Byoung-Yong; "Development of the Smartphone-based Colorimetry for Multi-analyte Sensing Arrays," RSC Publishing; Lab on a Chip; Jan. 2012.
(Continued)

*Primary Examiner* — Seyed H Azarian
(74) *Attorney, Agent, or Firm* — Whiteford, Taylor & Preston, LLP; Gregory M. Stone

(57) ABSTRACT

Systems and methods are provided for the rapid sensing of biological and environmental analytes employing a portable digital image capture device, such as a smartphone camera, to capture an image of colorimetric microwave-accelerated bioassays ("MAB"), and a digital image analyzer that processes the colorimetric signals captured by the digital camera to determine the concentration of analyte in a test sample based on a calculated pixel intensity in the captured digital image. Such systems and methods may be used to detect either a disease condition or the presence of a toxin in a particular test specimen and may generate an electronic alert that may serve to alert a medical practitioner of such disease condition or presence of a toxin so that medical intervention may be undertaken. Such electronic alert may optionally be transmitted to the user of a smartphone that captured the image, thus allowing for rapid, in-situ point-of-care analysis and detection of such conditions and immediate medical intervention.

18 Claims, 7 Drawing Sheets

(51) Int. Cl.
*G01N 21/31* (2006.01)
*G06T 7/00* (2017.01)
*G06T 7/90* (2017.01)

(58) Field of Classification Search
USPC ........... 382/100, 103, 106, 128–134, 162, 382/172–173, 181, 254, 285–291, 312, 382/224; 977/902; 536/25.4; 435/7.1; 422/69
See application file for complete search history.

(56) References Cited

U.S. PATENT DOCUMENTS

| | | | | |
|---|---|---|---|---|
| 10,436,776 | B2* | 10/2019 | Chung | G01N 33/543 |
| 2007/0042505 | A1* | 2/2007 | Israel | G01N 33/54373 |
| | | | | 977/902 |
| 2012/0028270 | A1* | 2/2012 | Geddes | G01N 33/54373 |
| | | | | 435/7.1 |
| 2012/0107952 | A1* | 5/2012 | Geddes | B82Y 20/00 |
| | | | | 422/69 |
| 2013/0102770 | A9* | 4/2013 | Geddes | G01N 21/6428 |
| | | | | 536/25.4 |
| 2018/0321137 | A1* | 11/2018 | Ismagilov | G01N 21/253 |
| 2019/0091695 | A1* | 3/2019 | Li | G01N 21/253 |
| 2022/0042066 | A1* | 2/2022 | Talebpour | C12Q 1/18 |
| 2022/0128570 | A1* | 4/2022 | Bergo | G01N 33/6848 |

OTHER PUBLICATIONS

Shen, Li, Papautsky, Ian, and Hagen, Josh; "Point-of-Care Colorimetric Detection with a Smartphone," RSC Publishing; Lab on a Chip; Sep. 2012.

Gallegos, Dustin et al.; "Label-Free Biodetection Using a Smartphone," RSC Publishing; Lab on a Chip; Apr. 2013.

* cited by examiner

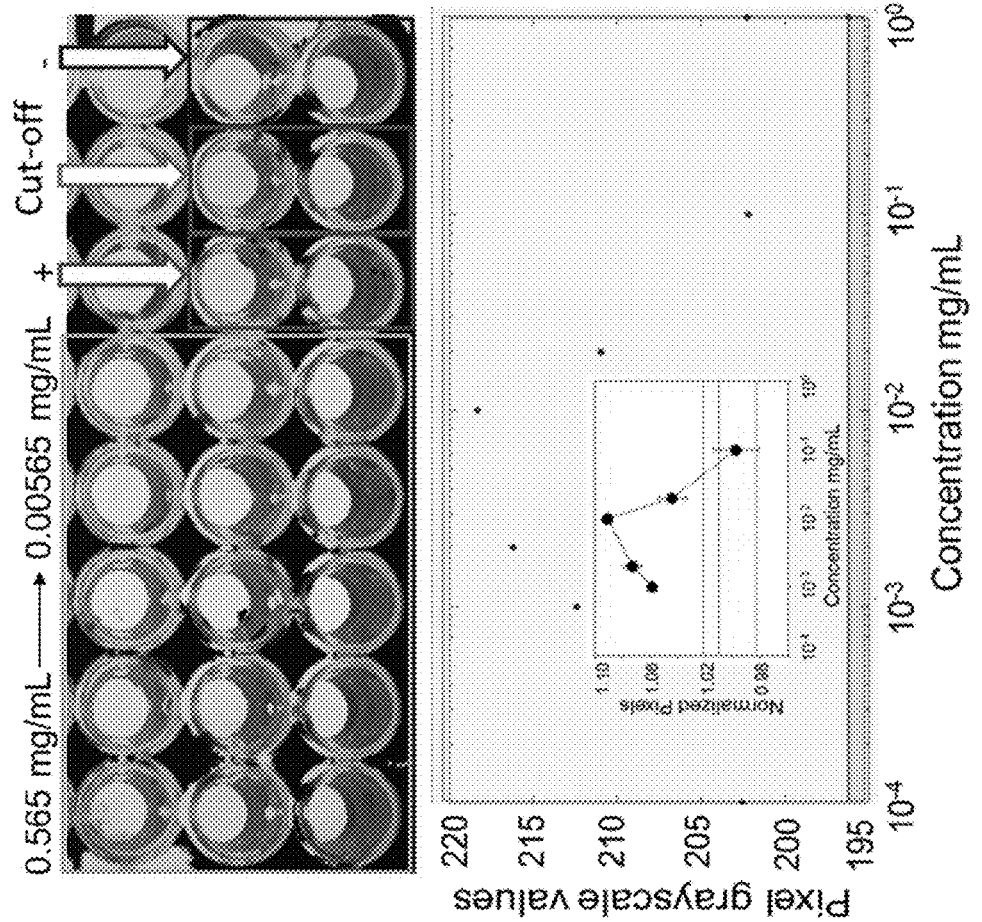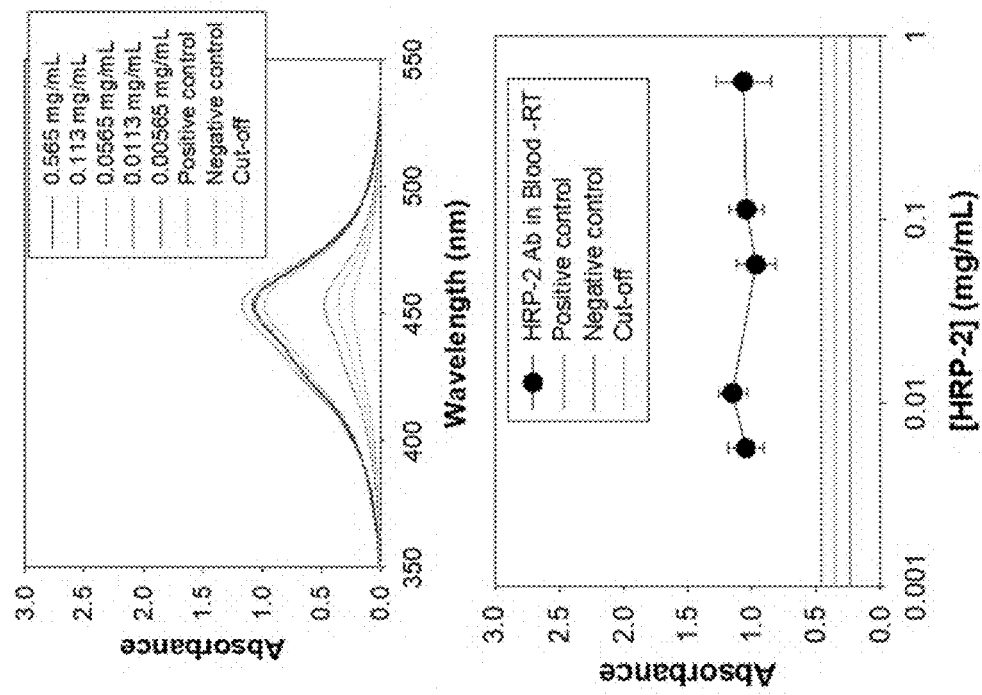
FIG. 6(a)  FIG. 6(b)  FIG. 6(c)  FIG. 6(d)

RAPID SENSING OF BIOLOGICAL AND ENVIRONMENTAL ANALYTES

CROSS REFERENCE TO RELATED APPLICATIONS

This application is based upon and claims the benefit of U.S. Provisional Application No. 62/990,489 titled "Rapid Sensing of Biological and Environmental Analytes Using Microwave-Accelerated Assays and a MATLAB Application," filed with the United States Patent & Trademark Office on Mar. 17, 2020, the specification of which is incorporated herein by reference in its entirety.

GOVERNMENT LICENSE RIGHTS

This invention was made with government support under W911NF-12-2-0022 awarded by the Army Research Laboratory—Army Research Office, and GM118973 awarded by the National Institutes of Health. The government has certain rights in the invention.

FIELD OF THE INVENTION

This invention relates generally to systems and methods for analyte detection, and more particularly to computer-implemented systems and methods for processing colorimetric assays carried out using microwave-accelerated bioassay techniques using a portable image capture device, such as a digital camera on a smartphone.

BACKGROUND OF THE INVENTION

Detection and quantification of analytes related to human health in biological and environmental samples have been a primary focus of scientists, health providers, and policy makers for several decades. In this regard, conventional methods such as colorimetric bioassays, blood cell analyzers and polymerase chain reaction (PCR) are routinely used in the analysis of biological samples. In addition, culture-based techniques for microbiological analysis and biochemical identification methods have been used as confirmatory tests for samples that test positive in spectroscopic and chromatographic methods (e.g., mass spectroscopy, gas chromatography, high-performance liquid chromatography, and intact cell mass spectrometry).

While the methods mentioned above are widely used, they can lack sensitivity, specificity, portability, rapidity, and repeatability, and they can have high operational and materials costs. Furthermore, most of these methods can require large quantities of samples and require highly trained and certified personnel to carry out those methods. As a result, there has been a continuous drive to develop new technologies and tools that can overcome these limitations of the current methods and instrumentation.

Recently, the inventors demonstrated that metal nanoparticles, such as silver island films impregnated on traditional platforms (high throughput screening wells and glass substrates), improved bioassay sensitivities and significantly reduced bioassay time when coupled with low power microwave heating. Other researchers have developed technologies, such as immuno-magnetic electroluminescence, microwave-accelerated metal-enhanced fluorescence, aptamer-magnetic bead ECL, and biosensors, which technologies have shown to improve the sensitivity of bioassays. However, these methods still require the use of traditional spectroscopy tools for optical measurements. New point-of-care tools for medical diagnostics and on-site monitoring of environmental samples necessitate the development of tools and software that can be employed at locations away from the typical laboratory setting.

Thus, notwithstanding the foregoing efforts, there nonetheless remains a need in the art for computer-implemented systems and methods configured to quickly detect the presence of biological and environmental analytes, particularly at the point-of-care and without the need for highly specialized spectroscopic equipment or excessively high levels of expertise that have made former detection efforts difficult.

SUMMARY OF THE INVENTION

Disclosed herein are computer-implemented systems and methods for the rapid sensing of biological and environmental analytes that avoid one or more disadvantages of prior art systems and methods. In accordance with certain aspects of the invention, such systems and methods employ a portable digital image capture device, such as a digital camera on a smartphone device, to capture an image of colorimetric microwave-accelerated bioassays ("MAB"), and a digital image analyzer that processes the colorimetric signals captured by the digital camera to determine the concentration of analyte in a test sample based on a calculated pixel intensity in the captured digital image. Such systems and methods may be used to detect either a disease condition or the presence of a toxin in a particular test specimen, and in an exemplary embodiment of the invention may generate an electronic alert that may serve to alert a medical practitioner of such disease condition or presence of a toxin so that medical intervention may be undertaken. Such electronic alert may optionally be transmitted to the user of the smartphone that captured the image, thus allowing for rapid, in-situ point-of-care analysis and detection of such conditions and immediate intervention in an inexpensive alternative to currently required instrumentation.

In an exemplary implementation, colorimetric bioassays for histidine-rich protein 2 (HRP-2) and microcystin-leucine arginine (MC-LR) toxin were carried out, both with the use of MABs and without microwave heating (i.e., gold standard bioassays) for comparison. The analyte detection method described herein is based on the direct correlation of color intensity of a solution calculated from images captured from the smartphone camera with the concentration of the biomolecule of interest. The results of such analyses demonstrated that the detection method disclosed herein can yield bioassay sensitivity that is comparable to the colorimetric gold standard tool, i.e., UV-Visible spectroscopy. In addition, colorimetric bioassay time for the HRP-2 assay (used in malaria diagnosis) and colorimetric MC-LR bioassay (used in MC-LR toxin diagnosis) was reduced from up to 2 hours at room temperature without microwave heating to 15 minutes using the MAB technique.

In accordance with certain aspects of an embodiment of the invention, a method is provided for rapid detection and analysis of biological and environmental analytes, comprising: preparing one or more colorimetric assays in a microwell plate; causing an image capture device on a portable computing and communications device to create a digital image of the microwell plate; transmitting the digital image of the microwell plate to a digital image analyzing computer, the digital image analyzing computer having a processor executing computer instructions configured to compute a pixel intensity in each well containing a colorimetric assay and an analyte concentration in each well containing a colorimetric assay based on the pixel intensity; and receiving at the portable computing and communications device from the digital image analyzing computer an electronic alert of a disease condition or presence of a toxin upon a determination at the processor that an analyte concentration in at least one of the colorimetric assays exceeds a predetermined threshold level of a molecule of interest.

In accordance with further aspects of an embodiment of the invention, a system is provided for rapid detection and analysis of biological and environmental analytes comprising: a microwell plate having one or more colorimetric assays; an image capture device on a portable computing and communications device configured to create a digital image of the microwell plate; and a digital image analyzing computer having a processor executing computer instructions configured to receive a digital image of the microwell plate from the image capture device, and to compute a pixel intensity in each well containing a colorimetric assay and an analyte concentration in each well containing a colorimetric assay based on the pixel intensity; and transmit from the digital image analyzing computer to the portable computing and communications device an electronic alert of a disease condition or presence of a toxin upon a determination at the processor that an analyte concentration in at least one of the colorimetric assays exceeds a predetermined threshold level of a molecule of interest.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which:

FIGS. 6(a)-6(d) show colorimetric responses for HRP-2 assay in blood on modified Ito bioassay platforms at room temperature and grayscale pixel values computed using methods in accordance with certain aspects of an embodiment of the invention.

DETAILED DESCRIPTION

Figure 1:
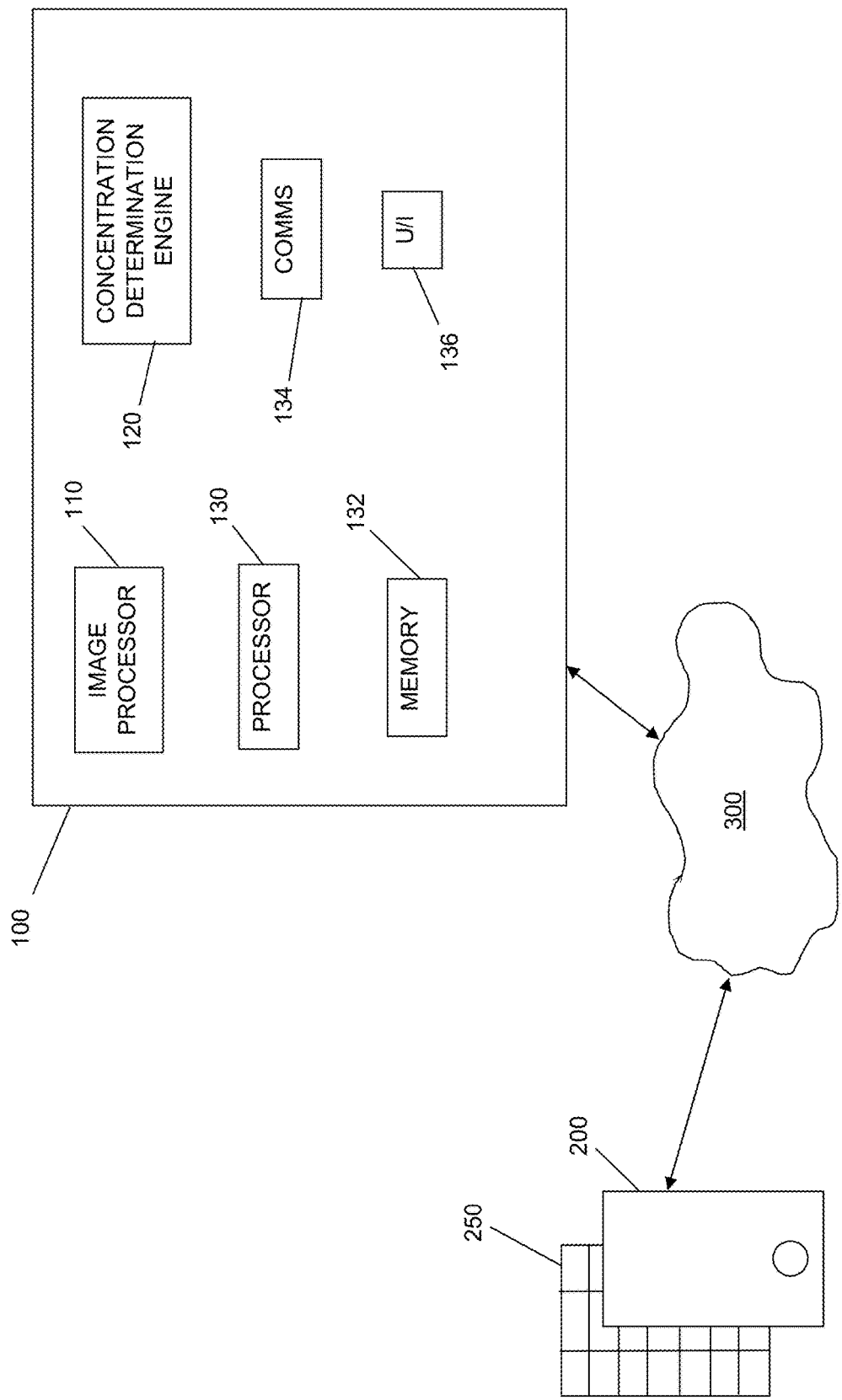
FIG. 1 is a schematic view of a system for rapid sensing of biological and environmental analytes according to certain aspects of an embodiment of the invention.

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

By way of summary, systems and methods configured in accordance with certain aspects of the invention provide for the rapid detection and analysis of biological and environmental analytes by microwave-accelerated bioassays (MAB) and a novel image processing method, which may be implemented by way of non-limiting example in MATLAB code, that analyzes colorimetric signals generated by the MABs. In an exemplary configuration, colorimetric bioassays for histidine-rich protein 2 (HRP-2) and microcystin-leucine arginine (MC-LR) toxin were carried out, both using MABs and without microwave heating (i.e., gold standard bioassays) for purposes of comparison. The MATLAB-based detection method is based on the direct correlation of color intensity of a solution calculated from images captured with a smartphone with the concentration of the biomolecule of interest using customized MATLAB code. This MATLAB-based detection method can yield bioassay sensitivity comparable to the colorimetric gold standard tool, i.e., UV-Visible spectroscopy. In addition, colorimetric bioassay time for the HRP-2 assay (used in malaria diagnosis) and colorimetric MC-LR bioassay (used in MC-LR toxin diagnosis) was reduced from up to 2 hours at room temperature without microwave heating to 15 minutes using the MAB technique.

FIG. 1 provides a schematic view of a system for rapid detection and analysis of biological and environmental analytes in accordance with certain aspects of an embodiment of the invention. The system comprises an analyte detection and analysis computer 100 that provides an image processing unit 110, an analyte concentration determination engine 120, a user interface 136, and hardware including a processor 130, memory 132, and a communications module 134 as discussed in further detail below. Analyte detection and analysis computer 100 communicates with a remote image capture device 200 preferably through wide area network 300 such as the Internet, such that a remote technician equipped with remote image capture device 200 may generate digital images of a microwell plate 250 containing specimens that are to be analyzed. As discussed in further detail below, a user may prepare a colorimetric assay in the microwell plate 250 and allow color development in each microwell, preferably following microwave heating using an MAB process. Following such color development and stopping of the reaction, the user may capture a digital image of the microwell plate 250 using remote image capture device 200, which in a preferred embodiment comprises a digital camera on a smartphone or similarly configured communications and computing device. Following the capture of that digital image, the user may transmit the digital image to analyte detection and analysis computer 100, such as through wide area network 300, for processing of the image. At analyte detection and analysis computer 100, image processing unit 110 computes pixel concentration in each analyte sample in microwell plate 250, and thereafter analyte concentration determination engine 120 determines the concentration of the biomolecule of interest in test samples based on that sample's pixel concentration. In accordance with certain aspects of a particular embodiment, upon the determination that the determined concentration of the biomolecule of interest in a test sample indicates a disease condition or a dangerous concentration of toxin, analyte detection and analysis computer 100 may generate and transmit an electronic alert to the user's smartphone or other device that includes remote image capture device 200 so that the user may take immediate steps toward medical intervention.

Figure 2:
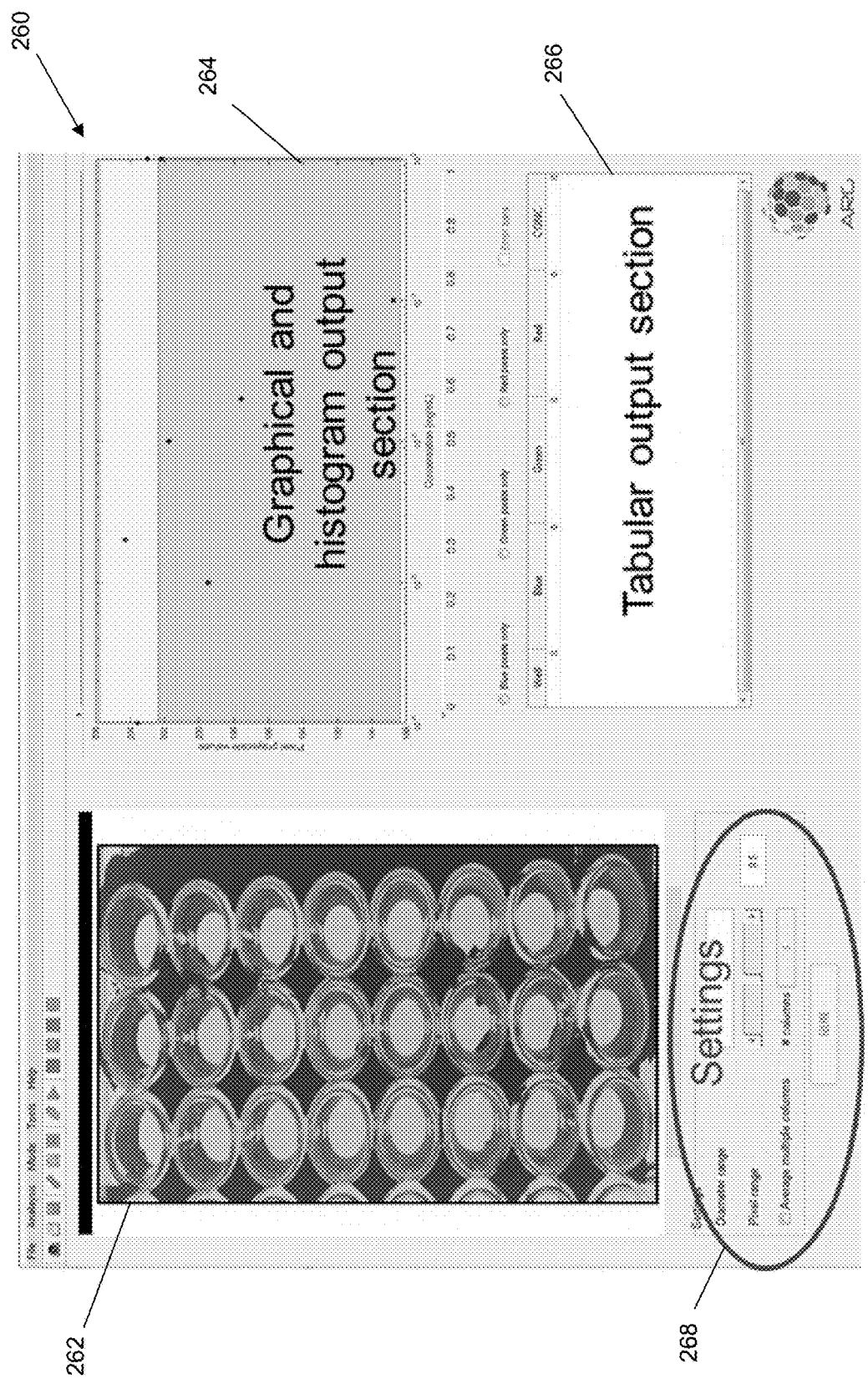
FIG. 2 shows an exemplary user interface screen that may be generated by the system of FIG. 1.

Preferably, user interface 125 may also provide the user of that remote device with a display (shown generally at 260) as shown in FIG. 2, which may by way of non-limiting example display the captured image 262, a graphical and histogram output window 264 and tabular output window 266 indicative of pixel concentrations and a plot of their related analyte concentrations, and a settings window 268 enabling the user to adjust processing parameters, which may include the number of rows and columns of the microwell plate 250 that are to be evaluated, the diameter range of those wells, and the pixel range for values that are to be detected during the image analysis process.

The following describes actual implementation of methods according to aspects of the invention during tests that evaluated bioassay concentration based upon pixel concentration computed from digital images of microwell plates using a digital camera on a smartphone device. Pixel normalization on both experiment and standard samples' pixel output was used during such tests and is preferred in implementations of the systems and methods set forth herein to provide for consistent and accurate results and may be accomplished using the following formula:

$$\text{Normalized sample pixels } (N_p) = \text{Sample pixels } (S_p) / \text{Blank well pixels } (B_{wp})$$

where $S_p$ represents grayscale and RGB pixels in the range 0-255 for experimental and standard samples, and $B_{wp}$ represents grayscale and RGB pixels in the range 0-255 for blank well samples. Ultimately, methods implemented in accordance with the invention convert pixel intensities into numerical values which then may be used to determine analyte concentration.

Protein assay, b-BSA (a model protein) was carried out and the colorimetric detection method was used to report the magnitude of the enzymatic signal. After the development of the colored product and the reaction was stopped with a stopping solution, optical images of the sample wells were taken using an iPhone smartphone camera (12 MP) under the following environments: (i) on the laboratory bench with incident light (room light) and a light emitting diode (LED) light source lighting the backside of the high-throughput screening ("HTS") wells; and (ii) in a dark room with only the LED light source lighting the backside of the HTS wells. The HTS wells were painted black on the sides of the wells, and the bottom side left clear to avoid crosstalk between the wells. Optical images were saved using JPEG file format and later uploaded into the GUI window of the main program using the insert button. Once the parameters (i.e., the number of rows, the number of columns, diameter range, and pixel range) were set, pixel computation in each well was performed, which yielded graphical and tabular output.

HRP-2 and MC-LR bioassays were prepared as follows. First, blood samples were centrifuged at 2500 rpm for 10 minutes and the supernatant serum aspirated using a pipette into plastic screw-capped vials. The serum was aliquoted and kept in Ziploc bags and frozen at −82° C. until when needed for experiments. Frozen serum and refrigerated blood were left to thaw and warm to room temperature. Mouse monoclonal antibodies against HRP-2 and MC-LR were diluted in PBS in ratios of 1:50, 1:100, 1:500, 1:1000, 1:5000, and 1:10000. To mimic the human body environment, the same setup was repeated except that the mouse monoclonal antibodies were diluted in whole blood and serum. Antibodies were stored at +4° C.

A stock solution of HRP-2 antigens received from the manufacturer was diluted ten-fold using PBS (pH=7.4) and stored at +4° C. MC-LR antigens were used as received (i.e., 0, 0.5, 1.0, 2.0, and 2.5 µg/L).

Figure 3:
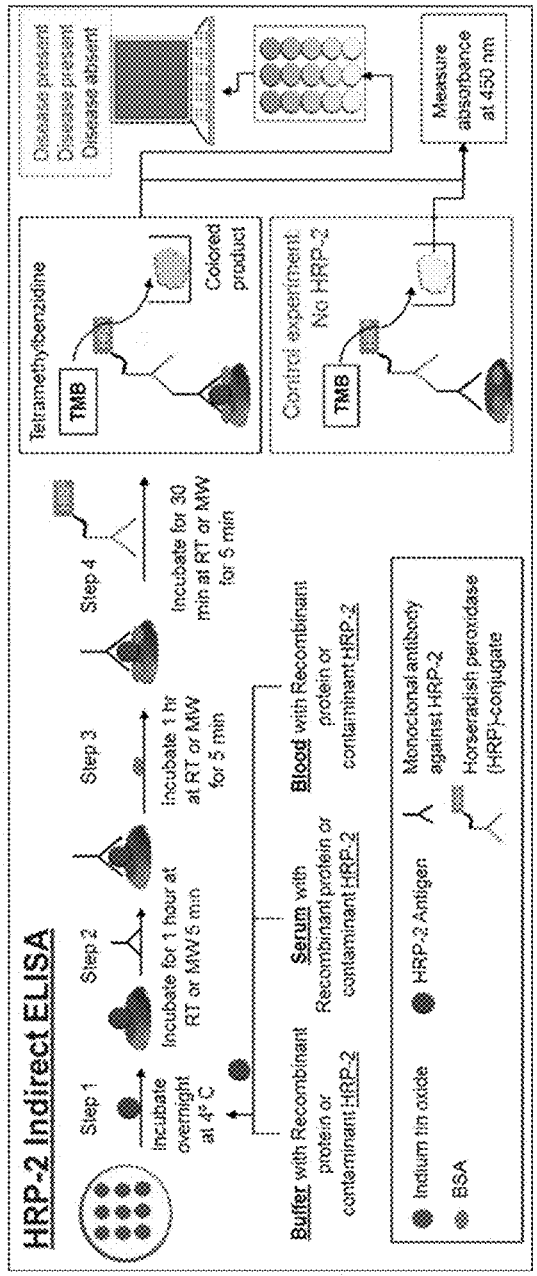
FIG. 3 is a schematic view of an indirect bioassay for HRP-2 in blood, serum and buffer performed on Ito bioassay platforms at room temperature and using the MAB technique.
Figure 4:
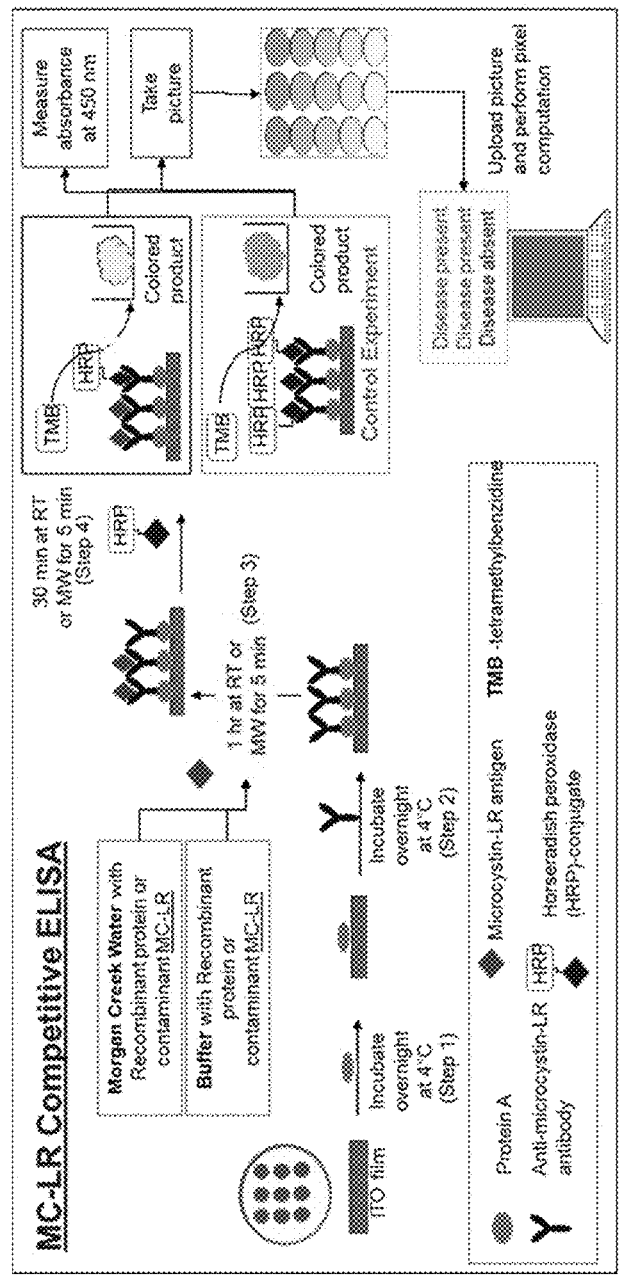
FIG. 4 is a schematic view of a competitive bioassay for microcystin-LR (MC-LR) in creek water and in buffer and performed on Ito bioassay platforms at room temperature and using the MAB technique.

FIGS. 3 and 4 show schematic views of indirect HRP-2 and MC-LR assays, respectively, each performed using both the MAB technique and at room temperature (no microwave heating as a control experiment). In the HRP-2 bioassay (shown in FIG. 3), the HRP-2 antigens were incubated overnight at +4° C. on indium tin oxide ("Ito") bioassay platforms. Unbound antigens were washed off using PBS wash buffer. Mouse monoclonal antibodies against HRP-2 were added and microwave heated for 5 minutes or incubated for 1 hour at room temperature. After washing the wells three times with washing buffer, the detection antibody (goat anti-mouse conjugated to RP) was added to the wells and microwave heated for 5 minutes or incubated for 1 hour at room temperature. A colorimetric bioassay substrate (i.e., tetramethylbenzidine or "TMB") was added and left to incubate at room temperature for 15 minutes or microwave heated for 5 minutes. The well contents were transferred into the HTS wells with outer walls painted black and containing a reaction stop solution of sulfuric acid. The camera of an iPhone 7 smartphone was used to take optical images of the colored product inside the wells. Pixel count on the picture images was performed using the novel MATLAB-based detection application described herein.

Likewise in the MC-LR bioassay (shown in FIG. 4), Ito bioassay platforms were coated with protein A and incubated overnight at +4° C. (FIG. 4, step 1). After washing the excess protein A from the wells, mouse monoclonal antibodies were introduced into the wells and left to incubate overnight at +4° C. (FIG. 4, step 2). MC-LR antigens of different concentrations as described above were added to the wells and incubated at room temperature for one hour or microwave heated for 5 minutes, after which RP-conjugate was added to the wells and microwave heated for 5 minutes or incubated at room temperature without microwave heating for 30 minutes. Unbound conjugate and MC-LR antigen were washed off the wells, and TMB substrate was added. The bioassay platform was microwave heated for 5 minutes or left at room temperature without microwave heating for 15 minutes to allow color development for the bioassay. Real color images and pixel computation for the MC-LR assay was done using a 12 MP iPhone smartphone camera and the MATLAB-based detection application as described above with respect to the HRP-2 assay.

For purposes of comparison, absorbance was also measured at 450 nm using UV-visible spectroscopy as well. MABs can follow a battery of blood/serum/buffer before going through a multi-step process that includes repeated incubation at room temperature or minimal microwave heating. HRP-2 bioassays that go through tetramethylbenzidine may be compared with the control experiment. In the case of the MC-LR assay, there are somewhat similar processes, but the main difference is that to identify a colored product, the experiment should yield a nice blue color.

Figure 5A:
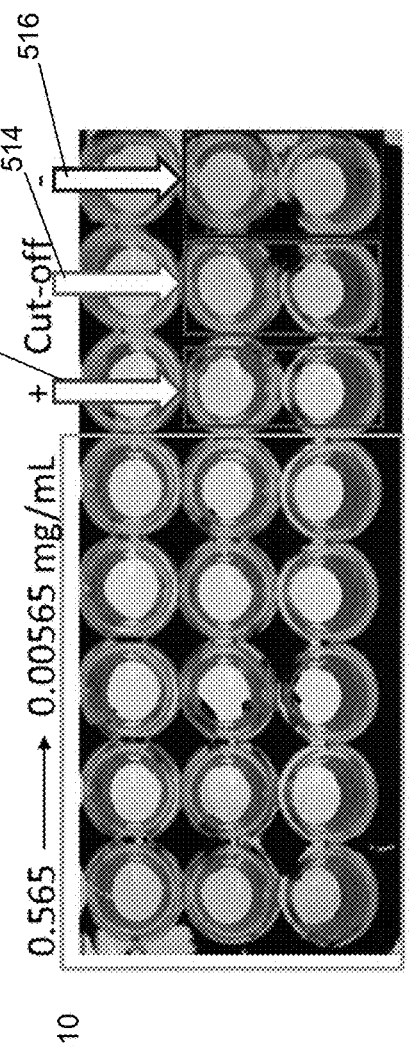
FIGS. 5(a)-5(d) show absorption spectra for HRP-2 assay in blood performed on Ito bioassay platforms using the MAB technique and normalized grayscale pixel values computed using methods in accordance with certain aspects of an embodiment of the invention.
Figure 5B:
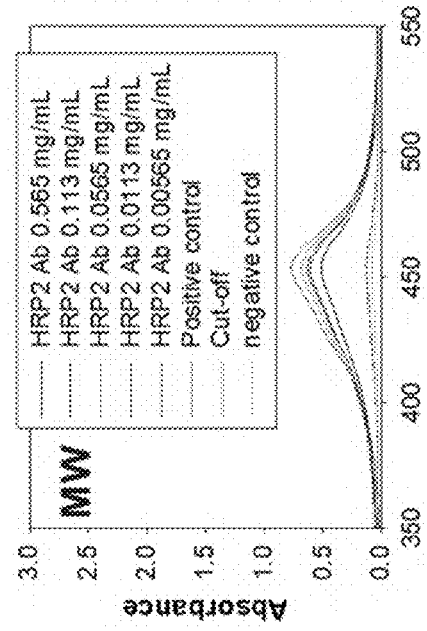
Figure 5C:
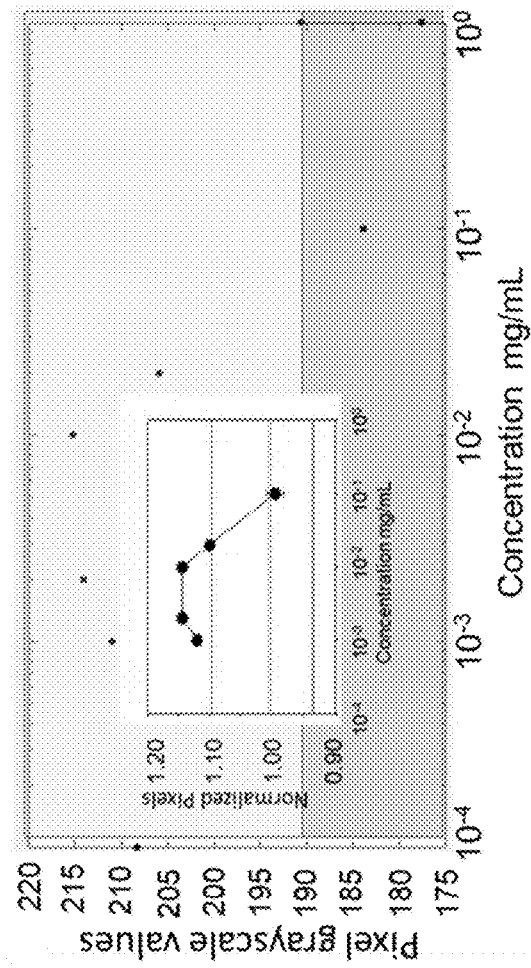
Figure 5D:
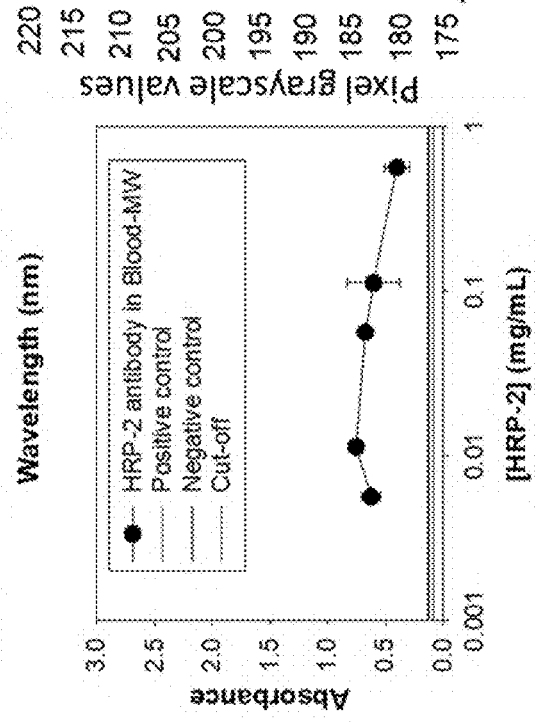

The methods discussed herein were evaluated to consider their efficiency in detecting the extent of HRP-2 antibodies in buffer, serum, and blood. The HRP-2 assay is a real-life assay used in malaria diagnosis. The experiments were performed using both the MAB technique and at room temperature without microwave heating and the results compared with those collected using an UV-Vis spectrophotometer. FIGS. 5(a)-5(d) show the colorimetric response and the grayscale pixels for HRP-2 assay in blood performed using the MAB technique (total assay time<20 min). From the optical absorption spectra shown in FIG. 5(a), all the samples in the concentration range of 0.565-0.00565 mg/mL exhibited absorbance of >0.4 compared to background (control experiments: positive, cut-off, and negative), which displayed absorbance of <0.1. The highest (~0.8) and the lowest (0.4) absorbance values were observed for samples with concentrations of 0.0113 mg/mL and 0.565 mg/mL, respectively (FIG. 5(b)). FIG. 5(c) shows the real color pictures for the enzymatic product for HRP-2 assay in blood. As shown in FIG. 5(c), the color is deep in sample wells 510 compared to control experiments: +ve 512, cut-off 514 and −ve 516. When the picture of the sample was uploaded into the software and converted into grayscale, the pixel intensity for each well was computed and the yield is as shown in FIG. 5(d). The grayscale pixel intensity was lowest (~183 pixels) for samples with a concentration of 0.565 mg/mL, and the grayscale pixel intensity increased gradually to the highest pixels of ~215 pixels, which was associated with 0.0565 mg/mL and 0.113 mg/mL before slightly reducing to ~ 210 pixels for 0.565 mg/mL samples. Subsequently, the pixel intensity for 0.113 mg/mL, 0.0113 mg/mL and 0.00565 mg/mL were 205, 215 and 210 pixels, respectively. From the software described herein, the lower limit of detection ("LLOD") for HRP-2 assay was undistinguishable because the +ve control: red bold horizontal lines generated higher normalized pixels (~1.1 pixels) compared to cut-off: green bold horizontal lines (~1.0 pixels) and −ve: blue bold horizontal lines (~0.94 pixels) control samples (Inset, FIG. 5(d)). However, under the UV-Vis analysis shown in FIG. 5(b), we observed a LLOD of 0.00565 mg/mL. It should be noted that the horizontal lines across each graph represents absorbances (in UV-vis analysis) and pixel values (in novel MATLAB software analysis) for control samples; red line (+ve control sample), green line (cut-off) and blue line (−ve control sample).

FIGS. 6(a)-6(d) display the results of an HRP-2 assay in blood conducted at room temperature without microwave heating as a control experiment. UV-vis analysis of the HRP-2 assay showed that the highest and lowest absorbance values were 1.1 and 0.9 for 0.0113 mg/mL and 0.565 mg/mL samples, respectively. Other samples yielded absorbance values as follows: 0.565 mg/mL (abs=1.06), 0.00565 mg/mL (abs=1.05) and 0.113 mg/mL (abs=1.04). Subsequently, the control samples displayed the following absorbance values: positive (abs=0.4638), cut off (abs=0.3553) and negative (abs=0.2386) (FIG. 6(b)). The image shown in FIG. 6(c) for the enzymatic product has the same organization and display as previously described in FIG. 5(c). However, the control samples in FIG. 6(c) developed slightly deeper color compared to those in FIG. 5(c) and this can be attributed to the long waiting periods at room temperature, which affords for more antigen-antibody complex formation. As a result, these complexes attach to the polyclonal antibodies bound to HRP enzyme and following the addition of a substrate, the enzyme breaks down the substrate to yield a yellow color. The color produced is proportional to the amount of chromogen bound, which is directly proportional to the amount of antigen-antibody complexes. Therefore, FIG. 6(c) depicts that the amount of antigen-antibody complexes formed in test samples are significantly predominant compared to those formed in control experiments. FIG. 6(d) demonstrates the output from the software in which the pixel intensity increased with a reduction in test sample concentration for the first three samples: 0.565 mg/mL (202 pixels), 0.113 mg/mL (210 pixels), and 0.0565 mg/mL (218 pixels). After the third sample, we observed a decline in pixel intensity, that is, 0.0113 mg/mL (216 pixels) 0.00565 mg/mL (212 pixels) and these reductions in pixel intensity can be attributed to the loss of pixels when the colored test sample picture is converted to grayscale format.

From the grayscale computation results for HRP-2 assay test sample pictures, we noted that the pixel output was not comparable with the real-color images of the enzymatic product in the wells. In this regard, we investigated whether pixel computation using the RGB color format can yield better and consistent results for HRP-2 test sample pictures. Because the colors for the enzymatic product for our HRP-2 assay is yellow, a construct of red, green, and blue proportions, we studied the effect of each color component in the three colors in the saturation of yellow color. Using random samples with an insignificant difference in saturation for the yellow color we performed RGB format pixel computation. Although the intensity of yellow color in images taken with a 12 MP iPhone camera appeared uniform in a 21 well bioassay plate, the distribution of intensity in the constituent colors (i.e., RGB) was apparent. The pixel values for green and red colors had an equal distribution (~250 pixels) in all 21 wells. However, the pixel values for blue color were varied in most of the wells. From these observations, it was evident that the blue color constituent (not green or red color component) determines the extent of brightness in the yellow color and as such, RGB format can be utilized for calibration in the novel software described herein.

To verify the observations mentioned above that blue color shows the widest variation in the brightness of yellow color developed as a result of colorimetric bioassays, we performed a real-life assay, HRP-2 bioassay, in the dynamic range 0.565-0.00565 mg/mL using the MAB technique. We note that the contents of HTS wells are colored enzymatic product from HRP-2 assay performed on Ito bioassay platforms and transferred into the HTS wells with a stop solution to end the enzymatic reaction. Separate wells of a microwell plate comprised different HRP-2 antibody concentrations, i.e., 0.565 mg/mL, 0.113 mg/mL, 0.0565 mg/mL, 0.0113 mg/mL, 0.00565 mg/mL, positive control, cut-off, negative control and blank sample. The absorbance values at 450 nm, grayscale and RGB pixel intensities for the colored product were determined using UV-vis spectroscopy and the MATLAB-based application described herein, respectively. The optical absorbance spectra indicate that sample absorbance values increased with increase in the concentration for test samples. These observations implied that high concentrations of HRP-2 antibodies can readily be recognized and combined with the immobilized HRP-2 antigens yielding a higher number of antigen-antibody complexes.

Upon the addition of HRP-conjugate (detector antibody) and later to a colorimetric bioassay substrate (tetramethylbenzidine), the intensity of the yellow color (deep yellow=high absorbance, light yellow=low absorbance) varied depending on the concentration/number of antibody-antigen complexes developed. However, the output from the grayscale pixel computation for the HRP-2 assay image showed that the pixels of the first three samples (0.565 mg/mL, 0.113 mg/mL and 0.0565 mg/mL) increased linearly with a decrease in sample concentration and then the pixels reduced for the last two samples (0.0113 mg/mL and 0.00565 mg/mL). These observations can be well explained by the fact that those wells having concentrations of 0.565, 0.113 and 0.05656 mg/mL displayed a deeper yellow color than the rest of the wells, such that after image conversion from color to grayscale, these wells appear darker than the remaining wells, thus resulting in a lower low grayscale pixel count. The grayscale pixels intensities for 0.0113 and 0.00565 mg/mL and control samples show a reduction in intensity, and this can be attributed to the loss of pixels during image conversion.

Conversely, the same picture image when subjected to RGB pixel computation generated interesting results. The green and red components produced results similar in trend to grayscale pixel computation; that is, an increase in pixel values with a decrease in the concentration for the first three samples. However, for the blue constituent, the pixel values consistently increase with a reduction in sample concentration. When we compared the output of optical absorbance from UV-vis spectrophotometric analysis and blue pixel computation, the relationship for absorbance values and pixels of yellow sample color is of inverse proportionality. Subsequently, we observed an LLOD of 0.00565 mg/mL for HRP-2 assay in buffer completed at room temperature without microwave heating and analyzed using UV-vis and RGB pixel computation (blue constituent).

Colorimetric responses were also obtained using UV-vis spectroscopy, grayscale, and RGB (blue component) pixel computation for HRP-2 assay in blood completed using the MAB technique. The optical absorbance values indicated the highest and lowest absorbance values of ~1.0 and ~0.5 in sample concentrations of 0.0565 mg/mL and 0.000565 mg/mL, respectively. Other HRP-2 assay test samples produced the following absorbance values: 0.113 mg/mL (Abs=0.85), 0.113 mg/mL (Abs=0.82), 0.00565 mg/mL (Abs~0.7), and 0.00113 mg/mL (Abs=0.67).

We observed absorbance values of 0.19, 0.08 and 0.12 for positive, cutoff, and negative control samples, respectively, and from these results we detected an LLOD of 0.000565 mg/mL for HRP-2 antibodies. Subsequently, we determined the grayscale pixels for the enzymatic product for HRP-2 assay in blood. From these results, we observed that the pixels values increased with a decrease in test sample concentration for the first four sample trials (i.e., 0.565 mg/mL (pixels=1.01), 0.113 mg/mL (pixels=1.06), 0.0565 mg/mL (pixels=1.09), and 0.0113 mg/mL (pixels=1.1), but the grayscale pixels reduced with a reduction in specimen concentration in the last two samples (0.00565 mg/mL (pixels=1.0), and 0.00113 mg/mL (pixels=0.98). The control samples exhibited the lower greyscale pixel values compared to the test results; that is, positive control (pixels=0.92), cut-off (pixels=0.94 and negative control (pixels=1.01). However, the pixel trend was different when we subjected the samples images into RGB (blue component) pixel computation. The blue pixel values for the HRP-2 assay images consistently increased with a decrease in sample concentration except for the first (0.113 mg/mL) and last (0.000565 mg/mL) sample sets which showed a slightly higher (0.66 pixels vs. 0.62 pixels) and lower (0.73 pixels vs. 0.77 pixels) blue pixels values compared to those in the next and previous sample neighbors, respectively. The control samples, positive, cut-off and negative controls showed higher blue pixel values (positive control=0.81, negative control=0.90 and cut-off=0.88) than HRP-2 antibody samples. In both RGB-blue pixel computation and Uv-vis spectrometric analysis, we witnessed a LLOD of 0.000565 mg/mL for HRP-2 assay in blood completed using the MAB technique.

Figures 7A, 7B:
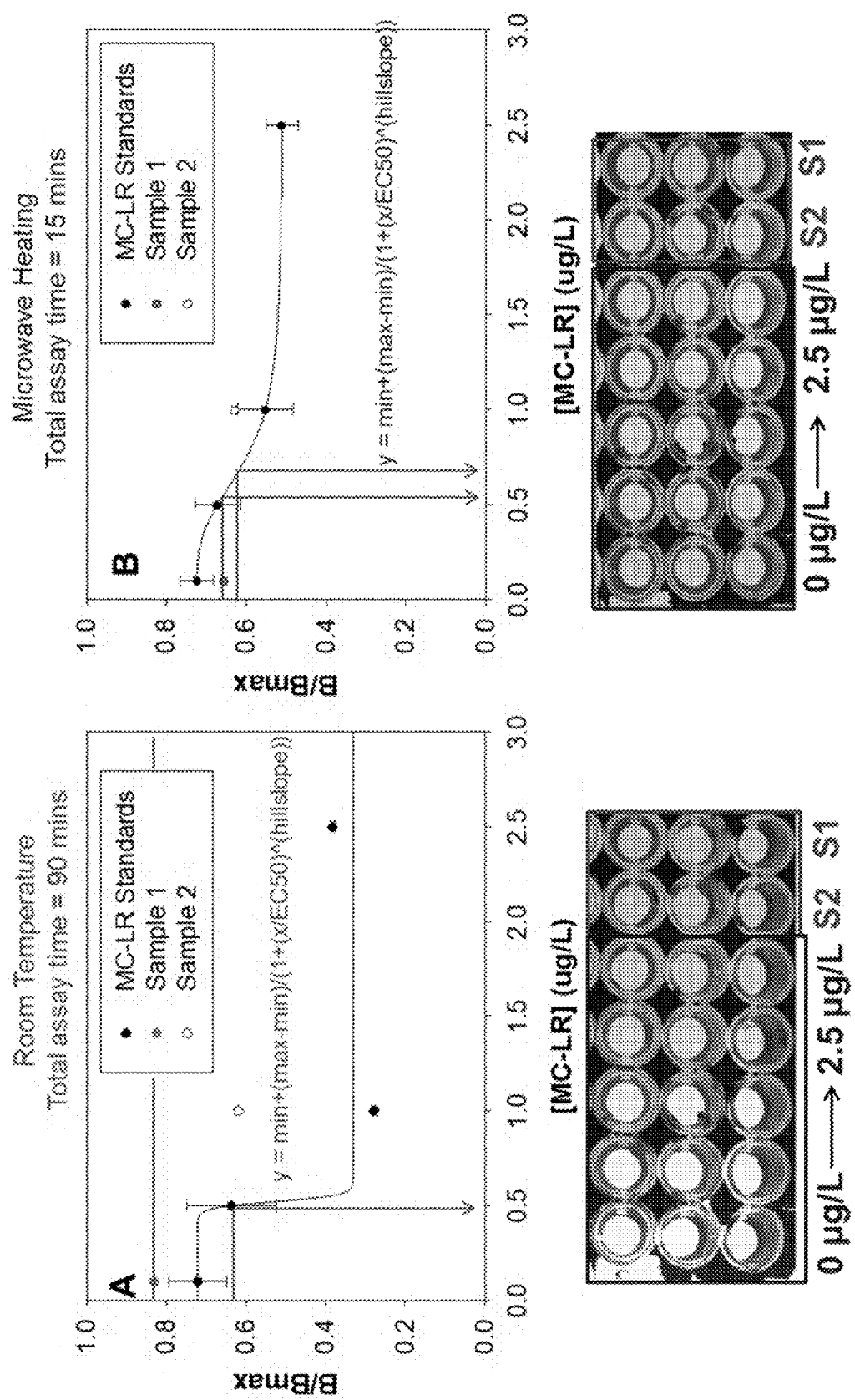
FIGS. 7(a)-7(b) show the colorimetric response for MC-LR assay in buffer and creek water for MC-LR standard and unknown samples (labeled S1 and S2) performed on Ito bioassay platforms using the MABs technique and at room temperature without microwave heating.

FIGS. 7(a)-7(b) show the colorimetric response for MC-LR assay in creek water for MC-LR standards and unknown samples (labeled S1 and S2) performed on Ito bioassay platforms using the MAB technique and at room temperature without microwave heating (total assay time=90 mins). The absorbance of the colored enzymatic product was analyzed using a UV-vis spectrophotometer. Figure FIG. 7(a) displays a standard curve for normalized absorbance values for MC-LR assay standard samples (concentrations: 0 µg/L, 0.1 µg/L, 0.5 g/L, 1.0 µg/L and 2.5 µg/L) completed at room temperature (total assay time=90 mins). Using the standard curve of [y=min+(max−min)/(1+(x/EC50)^(hillslope))] the estimated concentrations for the creek water spiked with MC-LR toxin were determined. The concentration of sample 1 (filled red circle) was undefined because when a trace line was drawn across the graph, it never intersected with the standard curve. The estimated concentration of sample 2 (empty white circle) was ~ 0.5 µg/L. FIG. 7(b) shows results for MC-LR assay completed under microwave heating (total assay time=15 mins) with the estimated concentration for sample 1 and sample 2 being ~0.5 and ~ 0.7 µg/L, respectively. The difference in the results can be attributed to the MAB technique which is well detailed in the previously published work.

Additional details of the foregoing experiments are set forth in Bonyi E, Constance E, Kukoyi Z, Jafar S, Aslan K., "Rapid Sensing of Biological and Environmental Analytes Using Microwave-Accelerated Bioassays and a MATLAB Application," *Nano Biomed Eng.* (Apr. 15, 2019), which publication is incorporated herein by reference in its entirety.

Figure 8:
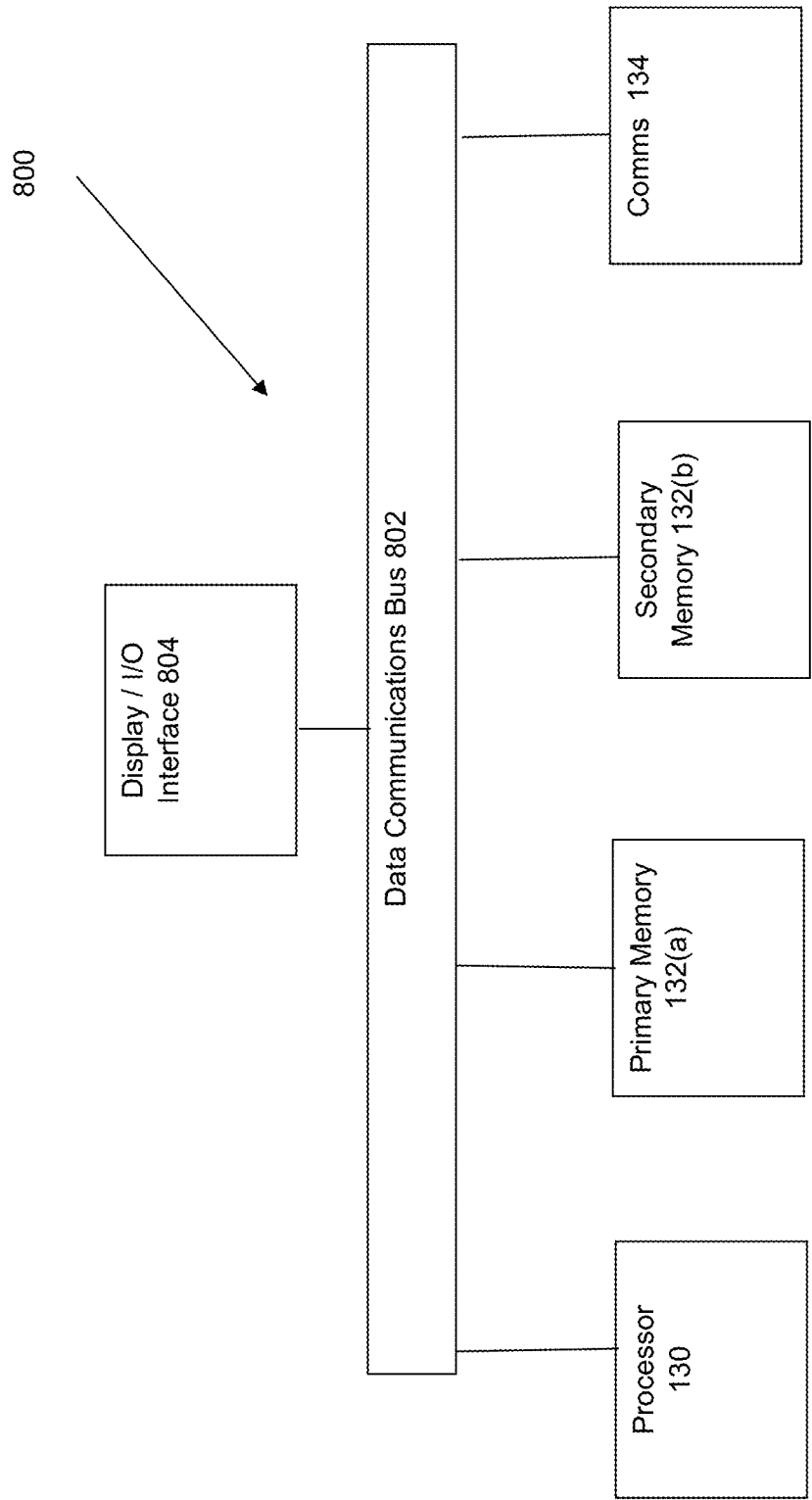
FIG. 8 is a schematic view of an exemplary computer system suitable for implementing the methods described herein.

Next, FIG. 8 shows an exemplary computer system architecture 800 suitable for implementing the methods described herein. Those skilled in the art will recognize that the system of FIG. 1 configured for rapid sensing of biological and environmental analytes may take the form of computer system 800 as reflected schematically in FIG. 8, though variations thereof may readily be implemented by persons skilled in the art as may be desirable for any particular installation. In each such case, one or more computer systems 800 may carry out the foregoing methods as computer code.

Computer system 800 includes a communications bus 802, or other communications infrastructure, which communicates data to other elements of computer system 800. For example, communications bus 802 may communicate data (e.g., text, graphics, video, other data) between bus 802 and an I/O interface 804, which may include a display, a data entry device such as a keyboard, touch screen, mouse, or the like, and any other peripheral devices capable of entering and/or viewing data as may be apparent to those skilled in the art. Further, computer system 800 includes processor 130, which may comprise a special purpose or a general purpose digital signal processor. Still further, computer system 800 includes a memory 132, which may include primary memory 132(*a*), which may include by way of non-limiting example random access memory ("RAM"), read-only memory ("ROM"), one or more mass storage devices, or any combination of tangible, non-transitory memory. Still further, memory 132 of computer system 800 includes a secondary memory 132(*b*), which may comprise a hard disk, a removable data storage unit, or any combination of tangible, non-transitory memory. Finally, computer system 800 may include communications module 134, such as a modem, a network interface (e.g., an Ethernet card or cable), a communications port, a PCMCIA slot and card, a wired or wireless communications system (such as Wi-Fi, Bluetooth, Infrared, and the like), local area networks, wide area networks, intranets, and the like.

Each of primary memory 132(*a*), secondary memory 132(*b*), communications module 134, and combinations of the foregoing may function as a computer usable storage medium or computer readable storage medium to store and/or access computer software including computer instructions. For example, computer programs or other instructions may be loaded into the computer system 800 such as through a removable data storage device (e.g., a floppy disk, ZIP disks, magnetic tape, portable flash drive, optical disk such as a CD, DVD, or Blu-ray disk, Micro Electro-Mechanical Systems ("MEMS"), and the like). Thus, computer software including computer instructions may be transferred from, e.g., a removable storage or hard disc to secondary memory 132(*b*), or through data communication bus 802 to primary memory 132(*a*).

Communication module 134 allows software, instructions and data to be transferred between the computer system 800 and external devices or external networks, such as remote device 200 (FIG. 1). Software, instructions, and/or data transferred by the communication module 134 are typically in the form of signals that may be electronic, electromagnetic, optical or other signals capable of being sent and received by communication module 134. Signals may be sent and received using a cable or wire, fiber optics, telephone line, cellular telephone connection, radio frequency ("RF") communication, wireless communication, or other communication channels as will occur to those of ordinary skill in the art.

Computer programs, when executed, allow the processor 130 of computer system 800 to implement the methods discussed herein for rapid sensing of biological and environmental analytes of FIG. 1, according to computer software including instructions.

Computer system 800 may perform any one of, or any combination of, the steps of any of the methods described herein. It is also contemplated that the methods according to the present invention may be performed automatically or may be accomplished by some form of manual intervention.

The computer system 800 of FIG. 8 is provided only for purposes of illustration, such that the invention is not limited to this specific embodiment. Persons having ordinary skill in the art are capable of programming and implementing the instant invention using any computer system.

Further, computer system 800 may, in certain implementations, comprise a handheld device and may include any small-sized computing device, including by way of non-limiting example a cellular telephone, a smartphone or other smart handheld computing device, a personal digital assistant, a laptop or notebook computer, a tablet computer, a hand-held console, an MP3 player, or other similarly configured small-size, portable computing device as may occur to those skilled in the art.

The system of FIG. 1 may, in an exemplary configuration, likewise be implemented in a cloud computing environment for carrying out the methods described herein. That cloud computing environment uses the resources from various networks as a collective virtual computer, where the services and applications can run independently from a particular computer or server configuration making hardware less important. The cloud computer environment includes at least one user computing device. The client computer may be any device that may be used to access a distributed computing environment to perform the methods disclosed herein and may include (by way of non-limiting example) a desktop computer, a portable computer, a mobile phone, a personal digital assistant, a tablet computer, or any similarly configured computing device.

A client computer preferably includes memory such as RAM, ROM, one or more mass storage devices, or any combination of the foregoing. The memory functions as a computer readable storage medium to store and/or access computer software and/or instructions.

A client computer also preferably includes a communications interface, such as a modem, a network interface (e.g., an Ethernet card), a communications port, a PCMCIA slot and card, wired or wireless systems, and the like. The communications interface allows communication through transferred signals between the client computer and external devices including networks such as the Internet and a cloud data center. Communication may be implemented using wireless or wired capability, including (by way of non-limiting example) cable, fiber optics, telephone line, cellular telephone, radio waves or other communications channels as may occur to those skilled in the art.

Such client computer establishes communication with the one or more servers via, for example, the Internet, to in turn establish communication with one or more cloud data centers that implement the system of FIG. 1. A cloud data center may include one or more networks that are managed through a cloud management system. Each such network includes resource servers that permit access to a collection of computing resources and components of the system of FIG. 1, which computing resources and components can be invoked to instantiate a virtual computer, process, or other resource for a limited or defined duration. For example, one group of resource servers can host and serve an operating system or components thereof to deliver and instantiate a virtual computer. Another group of resource servers can accept requests to host computing cycles or processor time, to supply a defined level of processing power for a virtual computer. Another group of resource servers can host and serve applications to load on an instantiation of a virtual computer, such as an email client, a browser application, a messaging application, or other applications or software.

The cloud management system may comprise a dedicated or centralized server and/or other software, hardware, and network tools to communicate with one or more networks, such as the Internet or other public or private network, and their associated sets of resource servers. The cloud management system may be configured to query and identify the computing resources and components managed by the set of resource servers needed and available for use in the cloud data center. More particularly, the cloud management system may be configured to identify the hardware resources and components such as type and amount of processing power, type and amount of memory, type and amount of storage, type and amount of network bandwidth and the like, of the set of resource servers needed and available for use in the cloud data center. The cloud management system can also be configured to identify the software resources and components, such as type of operating system, application programs, etc., of the set of resource servers needed and available for use in the cloud data center.

In accordance with still further aspects of an embodiment of the invention, a computer program product may be provided to provide software to the cloud computing environment. Computer products store software on any computer useable medium, known now or in the future. Such software, when executed, may implement the methods according to certain embodiments of the invention. By way of non-limiting example, such computer usable mediums may include primary storage devices (e.g., any type of random access memory), secondary storage devices (e.g., hard drives, floppy disks, CD ROMS, ZIP disks, tapes, magnetic storage devices, optical storage devices, MEMS, nanotech storage devices, etc.), and communication mediums (e.g., wired and wireless communications networks, local area networks, wide area networks, intranets, etc.). Those skilled in the art will recognize that the embodiments described herein may be implemented using software, hardware, firmware, or combinations thereof.

The cloud computing environment described above is provided only for purposes of illustration and does not limit the invention to this specific embodiment. It will be appreciated that those skilled in the art are readily able to program and implement the invention using any computer system or network architecture.

In summary, systems and methods configured in accordance with the foregoing may successfully enable the rapid sensing of biological and environmental analytes by using a portable digital image capture device, such as a digital camera on a smartphone device, to capture an image of colorimetric microwave-accelerated bioassays ("MABs"), and a digital image analyzer that processes the colorimetric signals captured by the digital camera to determine the concentration of analyte in a test sample based on a calculated pixel intensity in the captured digital image. Such systems and methods may be used to detect either a disease condition or the presence of a toxin in a particular test specimen, and in an exemplary embodiment of the invention may generate an electronic alert that may serve to alert a medical practitioner of such disease condition or presence of a toxin so that medical intervention may be undertaken. Such electronic alert may optionally be transmitted to the user of the smartphone that captured the image, thus allowing for rapid, in-situ point-of-care analysis and detection of such conditions and immediate intervention in an inexpensive alternative to currently required instrumentation. Methods according to aspects of the invention were shown to have successfully analyzed the colorimetric signal generated from a model protein bioassay for b-BSA, where the custom MATLAB-based application described herein computed pixel intensities in the range 0-255 of the colored enzymatic product in grayscale and RGB formats. Using a bioassay model system of the b-BSA assay and grayscale pixel computation, we observed LLODs of [b-BSA]=$10^{-8}$ M and [b-BSA]=$10^{-7}$ M for b-BSA bioassay completed on silvered and blank PMMA bioassay platforms using the MABs technique, respectively. HRP-2 in buffer and blood completed at room temperature yielded dense color (Abs >2.0 and >1.0, respectively) as compared to HRP-2 assay in serum (abs >0.5). LLODs of 0.0113 mg/mL and 0.00565 mg/mL were observed for HRP-2 assays in buffer and serum and blood, respectively. Using the MAB technique, HRP-2 assay in buffer and blood yielded absorbance values >1.0 and <1.0 and LLODs of 0.0113 mg/mL and 0.00565 mg/mL, respectively. HRP-2 assay in serum produced absorbance of <0.5 and LLOD of 0.00565 mg/mL. HRP-2 assay test sample images analyzed using grayscale pixel intensity computation showed inferior LLODs of 0.113 mg/mL as compared to the results of the same samples under UV-vis analysis which displayed LLODs of 0.00565 mg/mL. Our MATLAB-based application was efficient in HRP-2 assay samples, which developed deep yellow color compared to those that appeared lighter, and this was attributed to the loss of pixels during the conversion of colored sample images to grayscale picture format. Due to this limitation presented by the grayscale format, RGB (red, green, and blue) color scheme was instead used to calculate the pixel values for the yellow-colored enzymatic product. Subsequently, the green and red pixels did not vary significantly from each other implying that blue pixels regulated the luminosity of the yellow color. In that regard, the blue color channel was used in real-life assays (i.e., HRP-2 and MC-LR assay) experiments performed using the MABs technique and at room temperature without microwave heating as control experiments. A blue constituent of the RGB format yielded LLOD of 0.000565 mg/mL for HRP-2 assay test sample images completed using the MABs technique, which were similar to LLOD produced for the same samples under UV-Vis spectrometric analysis (LLOD=0.00565 mg/mL). Notably, the camera resolution (in terms of pixels) does not affect the outcome of the bioassay results provided pixel normalization be performed. The MATLAB-based application described herein has demonstrated remarkable sensitivity, shown affordability and portability.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A method for rapid detection and analysis of biological and environmental analytes, comprising:
   preparing one or more colorimetric assays in a microwell plate;
   causing an image capture device on a portable computing and communications device to create a digital image of the microwell plate;
   transmit the digital image of the microwell plate to a digital image analyzing computer, said digital image analyzing computer having a processor executing computer instructions configured to compute a pixel intensity in each well containing a colorimetric assay and an analyte concentration in each well containing a colorimetric assay based on said pixel intensity; and
   receiving at said portable computing and communications device from said digital image analyzing computer an electronic alert of a disease condition or presence of a toxin upon a determination at said processor that an analyte concentration in at least one of said colorimetric assays exceeds a predetermined threshold level of a molecule of interest;
   wherein computing a pixel intensity in each well containing a colorimetric assay and an analyte concentration in each well containing a colorimetric assay based on said pixel intensity further comprises generating at said processor a standard pixel intensity indicative of the predetermined threshold level of a molecule of interest, and comparing a computed pixel intensity of each colorimetric assay in each well to said standard pixel intensity.

2. The method for rapid detection and analysis of biological and environmental analytes of claim 1, wherein preparing one or more colorimetric assays in a microwell plate further comprises preparing said one or more colorimetric assays using a microwave-accelerated bioassay preparation method.

3. The method for rapid detection and analysis of biological and environmental analytes of claim 2, wherein said colorimetric assay further comprises a colorimetric bioassay for histidine-rich protein 2.

4. The method for rapid detection and analysis of biological and environmental analytes of claim 2, wherein said colorimetric assay further comprises a colorimetric bioassay for microcystin-leucine arginine.

5. The method for rapid detection and analysis of biological and environmental analytes of claim 1, wherein causing an image capture device on a portable computing and communications device to create a digital image of the microwell plate further comprises lighting said microwell plate from a back side of said microwell plate.

6. The method for rapid detection and analysis of biological and environmental analytes of claim 5, wherein a plurality of microwells of said microwell plate comprise a plurality of side walls and a bottom wall, wherein each of said side walls is opaque and said bottom wall is sufficiently translucent to allow illumination of said well from a light source positioned at the back side of said microwell plate.

7. The method for rapid detection and analysis of biological and environmental analytes of claim 1, wherein computing a pixel intensity in each well containing a colorimetric assay and an analyte concentration in each well containing a colorimetric assay based on said pixel intensity further comprises causing said processor to determine a normalized pixel count using the formula:

$$\text{Normalized sample pixels } (N_p) = \text{Sample pixels } (S_p) / \text{Blank well pixels } (B_{wp})$$

wherein $S_p$ represents grayscale or RGB pixels in the range of 0-255 for samples in each well, and $B_{wp}$ represents grayscale or RGB pixels in the range of 0-255 for blank wells.

8. The method for rapid detection and analysis of biological and environmental analytes of claim 1, wherein computing a pixel intensity in each well containing a colorimetric assay and an analyte concentration in each well containing a colorimetric assay based on said pixel intensity further comprises determining at said processor a blue color constituent of an RGB pixel count.

9. The method for rapid detection and analysis of biological and environmental analytes of claim 1, wherein determining at the processor that an analyte concentration in one of said assays exceeds a predetermined threshold level of a molecule of interest further comprises determining at said processor that a pixel intensity of said analyte in one of said assays is equal to or less than said standard pixel intensity.

10. A system for rapid detection and analysis of biological and environmental analytes comprising:
    a microwell plate having one or more colorimetric assays;
    an image capture device on a portable computing and communications device configured to create a digital image of the microwell plate;
    a digital image analyzing computer having a processor executing computer instructions configured to:
       receive a digital image of the microwell plate from said image capture device, and to compute a pixel intensity in each well containing a colorimetric assay and an analyte concentration in each well containing a colorimetric assay based on said pixel intensity; and
       transmit from said digital image analyzing computer to said portable computing and communications device an electronic alert of a disease condition or presence of a toxin upon a determination at said processor that an analyte concentration in at least one of said colorimetric assays exceeds a predetermined threshold level of a molecule of interest;
    wherein said computer instructions configured to compute a pixel intensity in each well containing a colorimetric assay and an analyte concentration in each well containing a colorimetric assay based on said pixel intensity are further configured to generate at said processor a standard pixel intensity indicative of the predetermined threshold level of a molecule of interest, and compare a computed pixel intensity of each colorimetric assay in each well to said standard pixel intensity.

11. The system for rapid detection and analysis of biological and environmental analytes of claim 10, wherein said one or more colorimetric assays further comprise assays prepared using a microwave-accelerated bioassay preparation method.

12. The system for rapid detection and analysis of biological and environmental analytes of claim 11, wherein said colorimetric assay further comprises a colorimetric bioassay for histidine-rich protein 2.

13. The system for rapid detection and analysis of biological and environmental analytes of claim 11, wherein said colorimetric assay further comprises a colorimetric bioassay for microcystin-leucine arginine.

14. The system for rapid detection and analysis of biological and environmental analytes of claim 10, further comprising a light source positioned with respect to said microwell plate to light said microwell plate from a back side of said microwell plate.

15. The system for rapid detection and analysis of biological and environmental analytes of claim 14, wherein a plurality of microwells of said microwell plate comprise a plurality of side walls and a bottom wall, wherein each of said side walls is opaque and said bottom wall is sufficiently translucent to allow illumination of said well from said light source.

16. The system for rapid detection and analysis of biological and environmental analytes of claim 10, wherein said computer instructions configured to compute a pixel intensity in each well containing a colorimetric assay and an analyte concentration in each well containing a colorimetric assay based on said pixel intensity further comprise computer instructions configured to cause said processor to determine a normalized pixel count using the formula:

Normalized sample pixels ($N_p$)=Sample pixels ($S_p$)/Blank well pixels ($B_{wp}$)

wherein $S_p$ represents grayscale or RGB pixels in the range of 0-255 for samples in each well, and $B_{wp}$ represents grayscale or RGB pixels in the range of 0-255 for blank wells.

17. The system for rapid detection and analysis of biological and environmental analytes of claim 10, wherein said computer instructions configured to compute a pixel intensity in each well containing a colorimetric assay and an analyte concentration in each well containing a colorimetric assay based on said pixel intensity further comprise computer instructions configured to determine at said processor a blue color constituent of an RGB pixel count.

18. The system for rapid detection and analysis of biological and environmental analytes of claim 10, wherein said computer instructions configured to determine at the processor that an analyte concentration in one of said assays exceeds a predetermined threshold level of a molecule of interest are further configured to determine at said processor that a pixel intensity of said analyte in one of said assays is equal to or less than said standard pixel intensity.

* * * * *